3,531,451
PROCESS FOR THE MANUFACTURE OF HIGH MOLECULAR WEIGHT HOMO- AND COPOLYMERS OF N-VINYLAZETIDINONES
Michael Lederer, Frankfurt am Main, and Horst Schnabel, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 28, 1967, Ser. No. 634,487
Claims priority, application Germany, May 17, 1966, F 49,223
Int. Cl. C08f 7/00
U.S. Cl. 260—85.5                                11 Claims

ABSTRACT OF THE DISCLOSURE

Homo- and copolymers of determined N-vinylazetidinones are prepared according to the polymerization process known per se, wherein compounds having polymerizable olefinic double bonds are used as comonomers for the copolymerization.

---

The present invention provides high molecular weight homo- and copolymers of N-vinylazetidinones and a process for preparing them.

It is known that many N-vinyllactams can be polymerized as such or together with other polymerizable unsaturated compounds to yield usable high molecular weight products (cf. German Pats. Nos. 757,355 and 954,197 as well as J. W. Breitenbach and A. Schmidt, Monatshefte 83, 1288–90 (1952)). As N-vinyllactams suitable for polymerizations of this type there have been, above all, disclosed N-vinylpyrrolidone, N-vinylpiperidone, N-vinylcaprolactam and N-vinyl-hexahydrophthalimide, i.e. compounds which are based upon a lactam ring having at least five members.

We have now found that high molecular weight homo- and copolymers of N-vinyllactams can be prepared by radicalic or ionic polymerization when using as N-vinyllactams N-vinylazetidinones of the following general formula

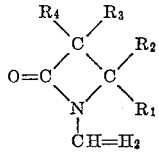

in which the radicals $R_1$, $R_2$, $R_3$ and $R_4$ which may be identical or different, represent hydrogen, straight-chain or branched aliphatic radicals preferably containing 1 to 12 carbon atoms, such as $CH_3$, $C_2H_5$, n—$C_3H_7$, n—$C_4H_9$, n—$C_5H_{11}$, n—$C_6H_{13}$, n—$C_7H_{15}$, n—$C_8H_{17}$, n—$C_9H_{19}$, n—$C_{10}H_{21}$, n—$C_{11}H_{23}$, n—$C_{12}H_{25}$, i—$C_3H_7$, i—$C_4H_9$, sec.—$C_4H_9$, i—$C_5H_{11}$, i—$C_6H_{13}$, i—$C_7H_{15}$, i—$C_8H_{17}$, i—$C_9H_{19}$, i—$C_{10}H_{21}$, i—$C_{11}H_{23}$, i—$C_{12}H_{15}$, aliphatic 5- or 6-rings such as cyclopentyl or cyclohexyl, an unsubstituted phenyl radical or a substituted phenyl radical, such as the p-tolyl, xylyl, methoxy phenyl, chlorophenyl and fluorophenyl radical, and, as comonomers, compounds having an olefinic double bond suitable for a polymerization, in an amount of up to 70% by weight, preferably only up to 60% by weight, calculated on the whole monomer mixture.

Some of the N-vinylazetidinones used according to the invention for the homopolymerization as well as for the copolymerization with other unsaturated comonomers, which come under the general formula cited above, are for example the following: N-vinyl-4-methylazetidinone, N-vinyl-3,4-dimethylazetidinone in cis- and in trans-position or as a mixture of both, N-vinyl-4,4-dimethylazetidinone and N-vinyl-4-phenylazetidinone. As comonomers for the copolymerization of the vinyl azetidinones are suitable vinyl compounds, for example acrylic acid and its derivatives such as acrylonitrile, acrylic acid amide and N-substituted acrylic acid amides such as N-methyl-, N,N-dimethyl-, N-ethyl, N,N-diethyl-, N-β-chlorethyl- or N-methylolacrylic acid amide, acrylic acid esters having an alcoholic component preferably containing 1 to 12 carbon atoms, such as acrylic acid methyl ester, acrylic acid ethyl ester, acrylic acid propyl ester, acrylic acid butyl ester, acrylic acid pentyl ester, acrylic acid hexyl ester, acrylic acid heptyl ester, acrylic acid octyl ester, acrylic acid 2-ethylhexyl ester, acrylic acid nonyl ester, acrylic acid decyl ester, acrylic acid undecyl ester and acrylic acid dodecyl ester; methacrylic acid and its derivatives corresponding to the derivatives of acrylic acid mentioned above; vinyl esters of aliphatic straight-chain or branched carboxylic acids preferably having 1 to 19 carbon atoms, such as vinyl acetate, vinyl propionate, vinyl-n-butyrate, vinyl isobutyrate, vinyl octoate, vinyl stearate and versatic acid vinyl ester; vinyl halides such as vinyl chloride, vinylidene chloride, trifluorochlorethylene, tetrafluoroethylene; vinyl ethers such as vinylmethyl ether, vinyl-n-butyl ether, vinyl-isobutyl ether, vinyl-octyl ether, vinyl-dodecyl ether, vinyl-octadecyl ether and vinyl-isobornyl ether; N-vinyllactams having 5-, 6- and 7- membered rings, such as N-vinyl-pyrrolidone, N-vinyl-piperidone, N-vinyl-caprolactam; N-vinyl-acid amides such as N-vinyl-N-methylformamide, N-vinyl-N-methylacetamide, N - vinyl - N - methylpropionamide, N-vinyl-N-ethylformamide, N - vinyl-N-ethyl-acetamide, N-vinyl-N-ethylpropionamide; N-vinylurethanes such as N-vinyl-carbamic acid methyl ester; N-vinyl-carbamic acid ethyl ester, vinyl sulfonic acid and vinylphosphonic acid and their mono-esters or their mono- and di-esters whose alcoholic components preferably contain 1 to 12 carbon atoms in a straight or branched chain, such as vinylsulfonic acid methyl ester, vinylsulfonic acid ethyl ester, vinylsulfonic acid n-propyl ester, vinylsulfonic acid isopropyl ester, vinylsulfonic acid n-butyl ester, vinylsulfonic acid isobutyl ester, vinylsulfonic acid 2-ethylhexyl ester, vinylphosphonic acid mono-methyl ester, vinylphosphonic acid mono-ethyl ester, vinylphosphonic acid mono-n-propyl ester, vinylphosphonic acid mono-isopropyl ester, vinylphosphonic acid mono-n-butyl ester, vinylphosphonic acid monoisobutyl ester, vinylphosphonic acid mono-2-ethylhexyl ester and vinyl phosphonic acid di-methyl ester, vinyl phosphonic acid diethyl ester, vinyl phosphonic acid di-n-propyl ester, vinyl phosphonic acid di-isopropyl ester, vinyl phosphonic acid di-n-butyl ester, vinyl phosphonic acid di-isobutyl ester, vinyl phosphonic acid di-2-ethylhexyl ester.

Furthermore, there are also mentioned as comonomers anhydrides of olefinically unsaturated di- and poly-carboxylic acids such, for example, as maleic acid anhydride and itaconic acid anhydride; esters of such olefinically unsaturated di- and poly-carboxylic acids whose alcoholic components preferably contain 1 to 12 carbon atoms, for example, maleic acid dimethyl ester, maleic acid diethyl ester, maleic acid di-n-butyl ester, maleic acid bis-2-ethyl hexyl ester, maleic acid n-butyl- (diethylene-glycol-monomethyl ether)-ester, maleic acid n-butyl- (diethyleneglycolmono-n-butyl ether)-ester, maleic acid n-butyl- (hexa - ethylene - glycolmonomethyl ether) - ester, maleic acid n - butyl - (hexaethylene-glycol-mono-n-butyl ether)-ester, maleic acid n-butyl- (octa-ethylene-glycolmonomethyl ether)-ester, maleic acid n-butyl-(octa-ethyleneglycolmono-n-butyl ether) - ester, fumaric acid dimethyl ester, fumaric acid diethyl ester, fumaric acid di-n-butyl ester, fumaric acid bis-2-ethyl-hexyl ester and itaconic acid dimethyl ester, itaconic acid diethyl ester or itaconic acid bis-2-ethylhexyl ester.

The comonomers are used in an amount of up to 70% by weight, preferably only up to 60% by weight, calculated on the whole monomer mixture. The homopolymerization of the N-vinyl-azetidinones as well as the copolymerization of these compounds with other unsaturated comonomers can be carried out by known methods, namely as mass polymerization, solution polymerization or precipitation polymerization.

The mass polymerization need not be explained further.

As solvents in the soluiton polymerization there can be used water, alcohols preferably containing 1 to 12 carbon atoms, such, for example, as mecthanol, ethanol, n- and iso-propanol, hexanol, 2-ethylhexanol, esters such as ethylacetate, ketones such as acetone, halohydrocarbons such as $CH_3Cl$, $CH_2Cl_2$, $CHCl_3$, $CCl_4$ and aromatic hydrocarbons such as benzene, toluene or xylene. It is surprising that most of the solvents do not, or do only slightly, influence the molar weights of the polymers.

The precipitation polymerization may be carried out in the presence of water, straight-chain and/or branched aliphatic hydrocarbons and of dialkyl ethers. As aliphatic hydrocarbons are suitable, for example, propane, butane, isobutane, pentane, hexane, heptane, octane and gasoline fractions having a boiling temperature range of from 20 to 250° C.

As dialkyl ethers are suitable ethers preferably containing 2 to 24 carbon atoms, the carbon chain being branched or unbranched, such, for example, as dimethyl ether, di-isopropyl ether, di-n-butyl ether, the straight-chain or branched dioctyl- and dilauryl ethers.

It is advantageous in the precipitation polymerization to add dispersing agents in amounts ranging from 0.05 to 10% by weight, calculated on the monomers to be polymerized. Suitable dispersing agents are high molecular weight compounds, preferably copolymers predominantly prepared from hydrophobic monomers, which have a small proportion of hydrophilic monomers, for example copolymers of acrylic acid esters whose alcoholic component preferably contains 6 to 12 carbon atoms, with N-vinyl-N-methylacetamide, N-vinyl-pyrrolidone and/or N-vinyl-azetidinones, as well as saponified copolymers of acrylic acid esters and vinyl esters.

The homo- and co-polymerization of N-vinylazetidinones is catalyzed by agents forming free radicals. As substances forming free radicals are suitable hydrogen peroxide and its derivatives as well as aliphatic azo compounds. Among the derivatives of hydrogen peroxide there are especially effective peroxy esters, such, for example, as trimethylacetic acid tert.-butyl-peroxy ester, furthermore peroxy acetals, diacyl peroxides, ketone-peroxides, α-acylamino peroxides and lactam peroxides. The peroxides may be combined with substances having a reducing effect.

Aliphatic azo compounds to be mentioned are compounds whose azo groups are linked to tertiary carbon atoms carrying a nitrile-, carboxyl-, ester- or an acid amide group. Preferred is azo-bis-isobutyric acid nitrile. The catalysts forming free radicals are generally used in amounts in the range of from 0.001 to 10% by weight, preferably 0.01 to 5% by weight, calculated on the monomers.

The temperature at which the polymerization is carried out, may range from 0 to 150° C., preferably from 30 to 120° C.

The novel polymers prepared according to the present invention exhibit some interesting properties: thus, the second order transition temperature of these polymers is, in any case, higher than 100° C. The second order transition temperatures of some polymers obtained in the presence of catalyst forming free radicals, are compiled in the following table:

TABLE

| Polymer | Second order transition temperature (in ° C.) |
|---|---|
| Poly-N-vinyl-4,4 - dimethylazetidinone | 110–115 |
| Poly-N-vinyl - 3,4-dimethylazetidinone | 114–123 |
| Poly-N-vinyl-4-methylazetidinone | 110–115 |

The second order transition temperatures have been measured in products dried for 15 hours at 80° C. in a vacuum of 200 millimeters of mercury, according to the method of the differential thermal analysis.

In an aqueous solution, the polymers moreover have a negative coefficient of solubility, i.e. the aqueous solutions of the polymers become turbid when heated and the polymer separates.

In the case of a solution polymerization in water, this negative coefficient of solubility may have a detirmental effect is as far as the polymer separates and deposits as a layer on the wall of the reaction vessel. This disturbs the heat transfer and hinders a thorough mixing. This effect can be avoided by carrying out the polymerization in the presence of water-soluble dispersing agents such, for example, as polyvinyl alcohol, methyl cellulose, gelatine, hydroxyethyl cellulose or of non-ionic emulsifiers of the types of oxyethylated alkylphenols.

It has furthermore been found that the negative coefficient or solubility can be modified by copolymerizing N-vinylazetidinones with monomers whose homopolymers are soluble in water and do not have a negative coefficient of solubility themselves. It is, for example, possible to prepare copolymers having defined turbidity points, by copolymerization N-vinyl-4.4-dimethyl-azetidinone with different amounts of N-vinyl-pyrrolidine or N-vinyl-N-methylacetamide.

The following table comprises turbidity points of poly-N-vinyl-4.4-dimethylazetidinone (I) and its copolymers with N-vinyl-N-methylacetamide (II–VI) and N-vinyl-pyrrolidone (VII–X):

TABLE

| | N-vinyl-4.4-dimethyl-azetidinone, percent by weight | N-vinyl-N-methyl-acetamide, percent by weight | N-vinyl-pyrrolidone-2, percent by weight | Turbidity point, ° C. |
|---|---|---|---|---|
| Content of: | | | | |
| I | 100 | | | 36.8–40 |
| II | 95.9 | 4.1 | | 47.9–48.4 |
| III | 91.7 | 8.3 | | 54.8–55.3 |
| IV | 86.8 | 13.2 | | 61.8–62.3 |
| V | 80.6 | 19.4 | | 72.8–74.3 |
| VI | 75.0 | 25.0 | | 83.6–84.1 |
| VII | 90.0 | | 10.0 | 48.2–48.5 |
| VIII | 84.6 | | 15.4 | 56.3–56.6 |
| IX | 76.2 | | 23.8 | 64.5–64.7 |
| X | 67.7 | | 32.3 | 74.5–74.9 |

The composition of the copolymers has been determined under the infrared-spectroscope by extinction of the carbonyl band which for I is at $5.73\mu$, for N-vinyl-N-methylacetamide at $6.07\mu$ and for N-vinyl-pyrrolidone at $5.92\mu$.

The homo- and co-polymerizations of N-vinylazetidinones may also be carried out in the presence of ionic catalysts. Such ionic catalysts are the Friedel-Crafts-catalysts, such, for example, as $AlCl_3$, $ZnCl_2$, $FeCl_3$, $SnCl_4$, $SbCl_3$, $SbCl_5$, $BF_3$ as well as its addition compounds such as $BF_3$-etherate and/or $BF_3$-dihydrate, furthermore mercury salts such as $HgCl_2$ or $HgSO_4$, bismuth halides such as $BiCl_3$ or $BiJ_3$, $SO_2Cl_2$ and strong acids such as $H_2SO_4$, HCl, $HClO^4$ and p-toluenesulfonic acid. These catalysts can be combined with co-catalysts such, for example, as water.

The ionic catalysts are also used in an amount ranging from 0.001 to 10% by weight, preferably 0.01 to 5% by weight, calculated on the monomers. The polymerization temperature may be in the range of from $-100°$ to $+100°$ C.

The ionically catalyzed homo- and co-polymerization of the N-vinylazetidinones is preferably carried out in the mass or in solution. As solvents there may be used halohydrocarbons such, for example, as $CH_2Cl_2$, $CH_3Cl$, $CHCl_3$ and/or $CCl_4$, aromatic hydrocarbons such as benzene, toluene, or xylene, aliphatic hydrocarbons such as propane, butane, isobutane, pentane, hexane, and/or aliphatic ethers such as dimethyl-, diethyl, diisopropyl-, di-n-butyl ether.

The ionically catalyzed homo-and co-polymerization of the N-vinylazetidinones provides liquid to solid polymers which differ from the products prepared in the presence of catalysts forming free radicals, by a somewhat modified structure: the infrared spectrum shows new bands at $6.03\mu$ and at $6.13\mu$.

The polymers prepared according to the invention by ionic catalysis, moreover behave in an aqueous solution differently from those prepared by radicalic catalysis. Within a concentration range of from 0.05 to 5%, the temperature height of the turbidity point is generally independent of the concentration in the products prepared by the ionic catalysis.

The polymers and copolymers of the N-vinylazetidinones prepared according to the present invention, have surface-active properties and are soluble in water, alcohols, halohydrocarbons, esters and aromatic hydrocarbons.

They are suitable as thickening agents, for the preparation of films and coatings and as impregnating and finishing agents.

The following examples serve to illustrate the invention without limiting it thereto, the values of the reduced specific viscosity have been measured in 1% methanolic solutions at 20° C.

EXAMPLE 1

10 grams of N-vinyl-4,4-dimethylazetidinone were polymerized in the mass with 0.1 gram of azo-bis-isobutyric acid nitrile as a catalyst at about 80° C. After 8 hours, a solid colorless polymer was obtained. After dissolution and reprecipitation from chloroform/ether, there were obtained 5.5 grams of a polymer having a reduced specific viscosity of 0.86. The turbidity point or the 5% aqueous solution was at 39.4° C.

EXAMPLE 2

10 grams of N-vinyl-4,4-dimethylazetidinone were polymerized in the mass with 0.1 gram of trimethylacetic acid tert.-butyl peroxy ester at 65° C. After a period of 6.5 hours, the polymerization was stopped and the polymer was dissolved and re-precipitated from chloroform with diethyl ether. There were obtained 5.5 grams of a polymer having a reduced specific viscosity of 0.48.

EXAMPLE 3

10 grams of N-vinyl-4,4-dimethylazetidinone and 10 grams of vinyl acetate were polymerized in the mass with 0.1 gram of azo-bis-isobutyric acid nitrile at 80° C. After a period of 8 hours, the colorless copolymer obtained was dissolved in chloroform and precipitated with diethyl ether. There were obtained 10.2 grams of a copolymer having a nitrogen content of 7.5% corresponding to 67% by weight of $\beta$-lactam which had been incorporated by polymerization. The reduced specific viscosity of the copolymer was 0.33.

EXAMPLE 4

10 grams of N-vinyl-4,4-dimethylazetidinone and 10 grams of acrylonitrile were polymerized in the mass with 0.1 gram of azo-bis-isobutyric acid nitrile at 80° C. The polymerization proceeded very briskly. There were obtained 10 grams of a copolymer having a nitrogen content of 16.6%.

EXAMPLE 5

8 grams of N-vinyl-3,4-dimethylazetidinone and 2 grams of methylmethacrylate were polymerized in the mass with 0.05 gram of azo-bis-isobutyric acid nitrile at 80° C. After a period of 7 hours, the colorless coplymer obtained was dissolved in chloroform and reprecipitated with diethyl ether. There were obtained 5.6 grams of a copolymer having a nitrogen content of 7.85%, corresponding to 70% by weight of $\beta$-lactam in the copolymer. The reduced specific viscosity was 0.52.

EXAMPLE 6

8 grams of N-vinyl-3,4-dimethylazetidinone and 2 grams of methacrylate were polymerized in the mass with 0.05 gram of azo-bis-isobutyric acid nitrile as the catalyst at 80° C. for 7 hours. The colorless copolymer obtained was dissolved in chloroform and reprecipitated with diethyl ether. There were obtained 5 grams of a copolymer having a nitrogen content of 7.2%. The reduced specific viscosity was 1.05.

EXAMPLE 7

8 grams of N-vinyl-3,4-dimethylazetidinone and 2 grams of vinylcetyl ether were polymerized with 0.05 gram of azo-bis-isobutyric acid nitrile as the catalyst at 80° C. for 7 hours. The copolymer formed was dissolved and reprecipitated from chloroform with diethyl ether; there were obtained 5.6 grams of a copolymer having a nitrogen content of 10.2%. The reduced specific viscosity was 0.69.

EXAMPLES 8–15

10 grams of the monomers were polymerized in 10 or 20 grams of the solvents indicated in the following table with 0.05 gram of azo-bis-isobutyric acid ester at 80° C. and under exclusion of air. The polymers were then isolated by precipitation with diethyl ether and dried at 70° C. in vacuo.

TABLE

| Example | Monomer | Solvent | Yield, g. | Red. spec. viscosity | Turbidity point, ° C. |
|---|---|---|---|---|---|
| 8 | 10 g. N-vinyl-4,4-dimethyl-azetidinone | 20 g. t-butanol | 9.9 | 0.23 | 42.5 |
| 9 | do | 20 g. benzene | 9.7 | 0.34 | 40.0 |
| 10 | do | 20 g. ethylacetate | 9 | 0.38 | 42.0 |
| 11 | 10 g. N-vinyl-3,4-dimethyl-azetidinone | 10 g. methanol | 9.1 | 0.53 | |
| 12 | do | 10 g. t-butanol | 9.8 | 0.61 | |
| 13 | do | 10 g. benzene | 9.9 | 0.54 | |
| 14 | do | 10 g. ethylacetate | 9.9 | 0.54 | |
| 15 | 10 g. N-vinyl-4-phenyl azetidinone | 50 g. benzene | 2 | 0.041+ | |

+ In $CHCl_3$.

From the values of the table (Examples 1–14) it results that the molar weights of the polymers, expressed by the reduced specific viscosity, were practically not influenced by the solvent.

EXAMPLE 16

In a reaction vessel provided with a stirrer, a reflux condenser, a thermometer and a dropping funnel, 680 cc. of water and 0.8 cc. of a 25% —NH$_3$— water were heated to a temperature of 85° C. Under an atmosphere of N$_2$, 160 grams of N-vinyl-4-methyl-azetidinone containing 0.4 gram of azo-bis-isobutyric acid nitrile, were added dropwise within 30 minutes, while stirring. After a polymerization period of 8 hours, the aqueous solution of the polymer still contained 0.2% by weight of a residual monomer, corresponding to a conversion rate of 99%. The reduced specific viscosity of the product dissolved and reprecipitated from a mixture of CHCl$_3$ and ether, was 1.08. The surface tension of the 1% solution in water was 61.3 dyn./cm. (at 20° C.).

EXAMPLE 17

In an apparatus as described in Example 16, a solution of 0.4 gram of a partially acetylated polyvinyl alcohol (dispersing agent) and 0.1 cc. of a 25% aqueous solution of NH$_3$ in 80 cc. of water was heated, while stirring, to a temperature of 85° C. 40 grams of N-vinyl-4,4-dimethylazetidinone containing 0.2 gram of azo-bis-isobutyric acid nitrile, were then added dropwise within 30 minutes. The polymer was obtained in the form of beads and the polymerization proceeded smoothly. After a polymerization period of 6 hours, the aqueous phase was decanted while still hot and the crumbly polymer was dried in vacuo. 39 grams were obtained. When the polymerization was carried out in the absence of a dispersing agent, the polymer which had formed deposited on the wall of the reaction vessel and the temperature could not be controlled any longer.

EXAMPLE 18

In an apparatus as described in Example 16, 400 cc. of n-hexane were heated to a temperature of 65° C. A mixture of 100 grams of N-vinyl-4,4-dimethylazetidinone, 0.5 gram of trimethylacetic acid-tert-butyl peroxy ester and 200 cc. of hexane was added thereto, while stirring, within 45 minutes. The polymer separated as a fine powder. After a period of 3.5 hours, there were obtained 63 grams of a polymer having a reduced specific viscosity of 0.42. The turbidity point of a 5% aqueous solution was in the range of from 30 to 40° C. The 1% aqueous solution had a surface tension of 50.5 dyn./cm. (at 20° C.).

EXAMPLE 19

40 grams of N-vinyl-4,4-dimethylazetidinone were polymerized in the manner described in Example 18, in 600 cc. of gasoline (boiling point 80–110° C.) with 0.5 gram of azo-bis-isobutyric acid nitrile as the catalyst at a temperature in the range of from 87 to 90° C. There were obtained 37 grams of a polymer having a reduced specific viscosity of 0.17. The turbidity point of a 5% aqueous solution was at 36° C. The surface tension of a 1% aqueous solution was 48.7 dyn./cm. (at 20° C.).

EXAMPLE 20

In the same manner as described in Example 18, 50 grams of N-vinyl-4,4-dimethylazetidinone were polymerized with 0.25 gram of trimethyl acetic acid tert-butyl peroxy ester in 500 cc. of di-iso-propyl ether at 68° C. The polymer was obtained as a fine-grained powder having a reduced specific viscosity of 0.18. The turbidity point of a 5% aqueous solution was at 40° C.

EXAMPLE 21

In the manner described in Example 18, a mixture of 45 grams of N-vinyl-3,4-dimethylazetidinone and 5 grams of 2-ethylhexyl acrylate was polymerized with 0.25 gram of azo-bis-isobutyric acid nitrile in 600 cc. of gasoline having a boiling point in the range of from 80 to 110° C., at 90° C. After a polymerization period of 4 hours, there were obtained 45 grams of a copolymer having a reduced specific viscosity of 0.60. From the nitrogen content of 9.6%, a composition of 85.6% by weight of N-vinyl-3,4-dimethyl-azetidinone and 14.4% by weight of 2-ethylhexyl acrylate could be calculated.

EXAMPLE 22

In the manner described in Example 18, a mixture of 50 grams of N-vinyl-3,4-dimethylazetidinone and 50 grams of 2-ethylhexyl acrylate was polymerized with 0.5 gram of azo-bis-isobutyric acid nitrile in 600 cc. of gasoline having a boiling point in the range of from 80 to 110° C., at 90° C. After a period of 4 hours, there was obtained a turbid solution of the copolymer (yield: 99 grams). The copolymer contained 5.55% of nitrogen corresponding to 49.6% by weight of N-vinyl-3,4-dimethyl-azetidinone.

EXAMPLE 23

In an apparatus as described in Example 16, 324 cc. of gasoline having a boiling point in the range of from 80 to 110° C. were heated to a temperature of about 90° C. In the gasoline 10 grams of 2-ethylhexyl acrylate were polymerized with 0.05 gram of azo-bis-isobutyric acid nitrile for 30 minutes until a conversion rate of about 50% was achieved. Subsequently, a mixture of 80 grams of N-vinyl-3,4-dimethylazetidinone, 10 grams of N,N-dimethyl acrylamide, 0.5 gram of azo-bis-isobutyric acid nitrile and 162 cc. of gasoline was added dropwise within 45 minutes. The polymer separated as a powder. After a polymerization period of 4 hours, there were obtained 93.2 grams of a copolymer having a reduced specific viscosity of 1.15. The copolymer contained 10.55% of nitrogen (determined by Dumas). By decomposing the copolymer with HCl, 1.3% of nitrogen were obtained since only dimethylamine-nitrogen was ascertained by this method. The copolymer separated from its turbid 5% aqueous solution at 45–46° C.

EXAMPLE 24

In an apparatus as described in Example 16, 324 cc. of gasoline having a boiling point in the range of from 80 to 110° C., were heated to a temperature of about 90° C. A solution of 128.56 grams of N-vinyl-4-methylazetidinone, 32.14 grams of maleic acid bis-2-ethylhexyl ester, 0.5 gram of azo-bis-isobutyric acid nitrile and 162 cc. of gasoline was added thereto, while stirring, within 45 minutes. The copolymer separated as a powder and, after a period of 4 hours, 150 grams of a copolymer having a reduced specific viscosity of 1.59 was obtained. The composition was calculated from the nitrogen content of 10.6% (by Dumas), from which resulted 84% by weight of N-vinyl-4-methylazetidinone and 16% by weight of maleinate.

EXAMPLE 25

Under exclusion of moisture and an atmosphere of N$_2$, 10 grams of N-vinyl-4,4-dimethylazetidinone were polymerized with 0.1 cc. of BF$_3$-etherate at 0° C. After a period of 24 hours, the highly viscous mass obtained was diluted with a 25% aqueous solution of NH$_3$, taken up in CHCl$_3$, filtered and dried over Na$_2$SO$_4$. By precipitating with diethyl ether, no solid polymer could be isolated. The solvents were decanted in vacuo at a temperature in the range of from 20 to 120° C.

There remained as a residue 4.1 grams of a polymer in the form of a highly viscous mass. The turbidity point of a 5% aqueous solution was at 48.5° C., that of a 0.05% aqueous solution was at 49° C. A 1% aqueous solution had a surface tension of 49.7 dyn./cm. (at 20° C.). The infrared spectrum showed absorption bands at 6.03$\mu$ and at 6.13$\mu$, which did not occur in a polymer prepared by radicalic catalysis.

When the polymerization described in Example 25 was carried out with an addition of 0.05 cc. of H$_2$O, while the other conditions remained the same, 5.66 grams of a polymer were obtained.

We claim:
1. A polyvinyllactam selected from homopolymers of an N-vinylazetidinone of the formula

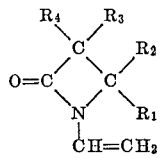

wherein $R_1$, $R_2$, $R_3$ and $R_4$ may be the same or different and are selected from hydrogen, hydrocarbon radicals of 1 to 12 carbon atoms, methoxyphenyl, chlorophenyl and fluorophenyl and copolymers of said N-vinylazetidinone and up to 70% by weight of units derived from ethylenically unsaturated comonomers copolymerizable therewith.

2. A poly-N-vinyllactam which is a polymer of an N-vinylazetidinone of the formula

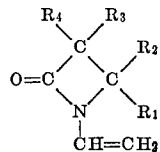

wherein $R_1$, $R_2$, $R_3$ and $R_4$ may be the same or different and are selected from hydrogen, hydrocarbon radicals of 1 to 12 carbon atoms, methoxyphenyl, chlorophenyl and fluorophenyl.

3. A poly-N-vinyllactam which is a copolymer of an N-vinylazetidinone of the general formula

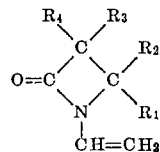

wherein $R_1$, $R_2$, $R_3$ and $R_4$ may be the same or different and are selected from hydrogen, hydrocarbon radicals of 1 to 12 carbon atoms, methoxyphenyl, chlorophenyl and fluorophenyl and copolymers of said N-vinylazetidinone and up to 70% by weight of units derived from ethylenically unsaturated comonomers copolymerizable therewith.

4. A poly-N-vinyllactam according to claim 3 wherein said comonomer is vinyl acetate.

5. A poly-N-vinyllactam according to claim 3 wherein said comonomer is acrylonitrile.

6. A poly-N-vinyllactam according to claim 3 wherein said comonomer is methylmethacrylate.

7. A poly-N-vinyllactam according to claim 3 wherein said comonomer is methylacrylate.

8. A poly-N-vinyllactam according to claim 3 wherein said comonomer is vinylcetyl ether.

9. A poly-N-vinyllactam according to claim 3 wherein said comonomer is 2 ethylhexyl acrylate.

10. A poly-N-vinyllactam according to claim 3 wherein said comonomer is N,N-dimethylacrylamide.

11. A poly-N-vinyllactam according to claim 3 wherein said comonomer is maleic acid bis-2-ethylhexyl ester.

References Cited

UNITED STATES PATENTS 3,129,210   4/1964   Grosser et al. _____ 260—88.3

DONALD E. CZAJA, Primary Examiner

M. J. WELSH, Assistant Examiner

U.S. Cl. X.R.

260—77.5, 79.3, 85.7, 86.1, 87.5, 87.7, 88.3